United States Patent
Tadokoro et al.

(10) Patent No.: US 9,889,424 B2
(45) Date of Patent: Feb. 13, 2018

(54) METHOD AND APPARATUS FOR PRODUCING RADIONUCLIDE

(71) Applicant: Hitachi, Ltd., Tokyo (JP)

(72) Inventors: Takahiro Tadokoro, Tokyo (JP); Yuko Kani, Tokyo (JP)

(73) Assignee: Hitachi, Ltd., Tokyo (JP)

(*) Notice: Subject to any disclaimer, the term of this patent is extended or adjusted under 35 U.S.C. 154(b) by 227 days.

(21) Appl. No.: 14/795,897

(22) Filed: Jul. 10, 2015

(65) Prior Publication Data
US 2016/0023182 A1 Jan. 28, 2016

(30) Foreign Application Priority Data
Jul. 25, 2014 (JP) .................. 2014-151342

(51) Int. Cl.
*B01J 19/08* (2006.01)
*B01J 19/00* (2006.01)
*B01J 19/10* (2006.01)
*G21G 1/10* (2006.01)

(52) U.S. Cl.
CPC ......... *B01J 19/085* (2013.01); *B01J 19/0013* (2013.01); *B01J 19/10* (2013.01); *G21G 1/10* (2013.01); *B01J 2219/0801* (2013.01); *B01J 2219/0871* (2013.01); *B01J 2219/0879* (2013.01)

(58) Field of Classification Search
CPC ...... B01J 19/085; B01J 19/0013; B01J 19/10; B01J 2219/0801; B01J 2219/0871; B01J 2219/0879; G21G 1/10; G21G 1/001; G21G 1/12; C01G 57/00; C01G 39/02
See application file for complete search history.

(56) References Cited

U.S. PATENT DOCUMENTS 3,833,469 A * 9/1974 Robson ............... C01G 99/006
250/303
5,338,913 A * 8/1994 Finn ........................ C23C 14/30
219/121.16
5,802,439 A * 9/1998 Bennett ................... G21G 1/12
376/186

FOREIGN PATENT DOCUMENTS

WO 2011/132265 A1 10/2011

OTHER PUBLICATIONS

Yu. d. Tur, Linear Electron Accelerator for the Medical Isotopes Production; Proceedings of EPAC 2000, p. 2560-2562, Vienna, Austria.

(Continued)

*Primary Examiner* — Xiuyu Tai
(74) *Attorney, Agent, or Firm* — Mattingly & Malur, PC

(57) ABSTRACT

A method for producing a radionuclide is provided that produces molybdenum trioxide 99 (Mo-99.$O_3$) and technetium oxide 99m (Tc-99$m_2$.$O_7$) by emitting an electron beam accelerated by an electron linear accelerator to a molybdenum trioxide 100 (Mo-100.$O_3$) powder sample, and which separates and purifies technetium oxide 99m from both the molybdenum trioxide 99 and the technetium oxide 99m by using a radionuclide separation/purification unit. The method for producing a radionuclide supplies temperature-regulated gas to the molybdenum trioxide 100 powder sample during an irradiation period during which the electron beam is emitted to the molybdenum trioxide 100 powder sample.

10 Claims, 6 Drawing Sheets

(56) References Cited

OTHER PUBLICATIONS

Jerry D. Christian et al., Advances in Sublimation Separation of Technetium from Low-Specific-Activity Molybdenum-99, Ind. Eng. Chem. Res. 2000, 39, pp. 3157-3168.
Nuclear Energy Agency, The Supply of Medical Radioisotopes, Nuclear Development Nov. 2010.

* cited by examiner

METHOD AND APPARATUS FOR PRODUCING RADIONUCLIDE

BACKGROUND OF THE INVENTION

1. Field of the Invention

The present invention relates to a method and an apparatus for producing a radionuclide using an accelerator, and in particular, to a method and an apparatus for producing a radionuclide, capable of efficiently producing a radionuclide that is a source material of a nuclear medicine diagnostic pharmaceutical, using a small-sized, lightweight apparatus.

2. Description of the Related Art

Conventionally, molybdenum 99 (Mo-99), which is used as a source material of a nuclear medicine diagnostic pharmaceutical, is obtained by collecting and purifying a product produced in a nuclear reactor as a fission product of a high or low concentration of uranium 235 (U-235). Facilities that use a nuclear reactor for production as described above are limited in number, and are also lopsidedly located in the world. Countries not having such a facility rely on importation by airfreight, and thus have a concern for stable supply.

A facility that uses a nuclear reactor for production also has issues regarding facility operation, including temporal degradation of the nuclear reactor. Thus, the issue of stable supply also exists. Although Japan has many nuclear reactors, including commercial reactors and test reactors, Mo-99 is not produced domestically, and thus fully relies on importation. Need for huge investment and maintenance cost in a production facility that uses a nuclear reactor disrupts tangible progress with domestic production using a nuclear reactor.

Meanwhile, a method for producing Mo-99 without using nuclear fission reaction has been extensively studied.

First, a first method for producing a radionuclide is neutron activation of molybdenum 98 (Mo-98) [Mo-98(n, γ)Mo-99]. Since this reaction can be triggered using a neutron source, neutron generated by an accelerator may be used instead of neutron generated by a nuclear reactor.

In addition, methods for producing a radionuclide with use of an accelerator include one that utilizes a reaction between molybdenum 100 (Mo-100) and neutron (Mo-100 (n, 2n)Mo-99). Such methods may be able to solve issues such as the need for huge investment and maintenance cost in a production facility that uses a nuclear reactor.

However, these methods using neutron require a large-scale accelerator, and also need providing a large screen around a Mo-98 or Mo-100 target, thus posing a problem of large overall size of the apparatus. Moreover, such methods each have a low yield, and provide a low specific activity due to a relatively high abundance ratio of Mo-98 or Mo-100 to required Mo-99, as compared with the method using nuclear fission described above, and therefore also pose problems in that, for example, the purification technique that has been established for a facility using a nuclear reactor cannot be applied. Nevertheless, purification technique is also being developed for the methods using an accelerator described above, and it is also becoming possible to obtain Tc-99m, which is ultimately needed as a source material of a nuclear medicine diagnostic pharmaceutical.

WO 2011/132265 A discloses a method in which accelerated proton is emitted to molybdenum 100 (Mo-100) [Mo-100(p, pn)Mo-99 or Mo-100(p, 2n)Tc-99m] as another method for producing a radionuclide using an accelerator. However, emitting accelerated proton to molybdenum 100 (Mo-100) generates not only Mo-99 and Tc-99m, but also technetium 99 (Tc-99) (Mo-100(p, 2n)Tc-99), and thus poses a problem in that Tc-99m having a high specific activity cannot be obtained in principle.

SUMMARY OF THE INVENTION

An object of the present invention is to provide a method and an apparatus for producing a radionuclide, capable of efficiently producing a radionuclide that is a source material of a nuclear medicine diagnostic pharmaceutical, using a small-sized, lightweight apparatus.

To solve the above-described object, an aspect of the present invention lies in a method for producing a radionuclide that produces molybdenum trioxide 99 (Mo-99.$O_3$) and technetium oxide 99m (Tc-99$m_2$.$O_7$) by emitting an electron beam accelerated by an electron linear accelerator to a molybdenum trioxide 100 (Mo-100.$O_3$) powder sample, and which separates and purifies technetium oxide 99m from both the molybdenum trioxide 99 and the technetium oxide 99m by using a separation/purification unit, the method including: supplying temperature-regulated gas to the molybdenum trioxide 100 powder sample during an irradiation period during which the electron beam is emitted to the molybdenum trioxide 100 powder sample.

According to the present invention, a radionuclide that is a source material of a nuclear medicine diagnostic pharmaceutical can be efficiently produced with a small-sized, lightweight apparatus.

DESCRIPTION OF THE PREFERRED EMBODIMENTS

Figure 1:
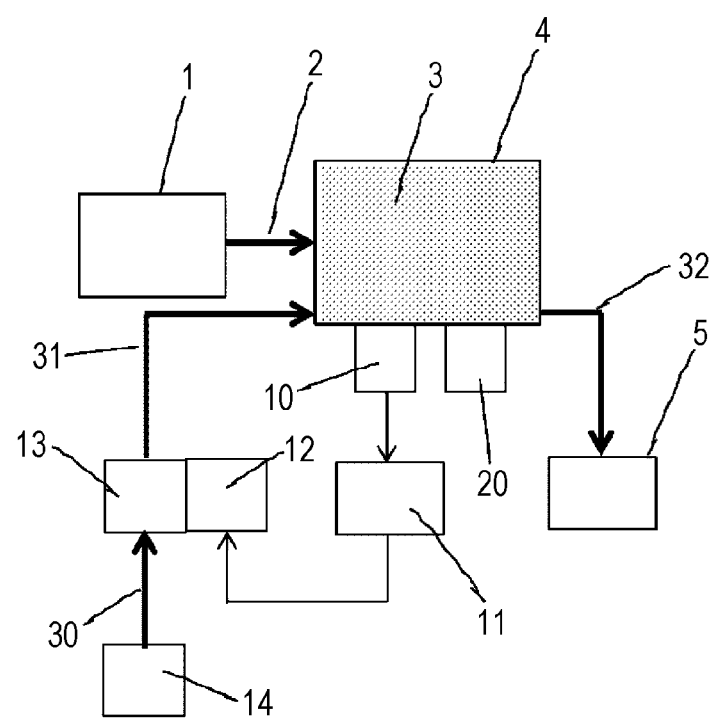
FIG. 1 is a configuration diagram illustrating a configuration of an apparatus for producing a radionuclide according to a first embodiment, which is one preferred embodiment of the present invention.

Molybdenum trioxide 99 (Mo-99.$O_3$) is produced by emitting an electron beam accelerated by an electron linear accelerator to a radionuclide-producing source material (e.g., a powder sample of molybdenum trioxide 100 (Mo-100.$O_3$)). By supplying gas (e.g., oxygen-containing gas) to the molybdenum trioxide 99 (Mo-100.O$_3$) produced, technetium oxide 99m (Tc-99m$_2$.O$_7$) is produced after molybdenum 99 (Mo-99) in the molybdenum trioxide 99 (Mo-100.O$_2$) decays.

The radionuclide production section can be reduced in size due to a fact that an electron linear accelerator can be smaller in size than a proton accelerator or a heavy particle accelerator for a same acceleration energy, and that the production cross section of a (γ, n) reaction that generates Mo-99 from Mo-100 is comparable with the cross-sectional area of when Mo-99 is generated through another reaction, such as a method using a reaction between Mo-100 and neutron (Mo-100(n, 2n)Mo-99), or a method in which accelerated proton is emitted to Mo-100 (Mo-100(p, pn)Mo-99 or Mo-100(p, 2n)Tc-99m). The generated Mo-99 changes into technetium 99m (Tc-99m), which is a progeny nuclide, with a half-life of 66 hours. Technetium 99m (Tc-99m) is a nuclide that is required as a radiopharmaceutical in nuclear medicine, and molybdenum 99 (Mo-99) is a source material thereof. Technetium 99m (Tc-99m) changes into Tc-99, which is a progeny nuclide, with a half-life of 6.02 hours. Due to the fact that Tc-99 is not needed for a radiopharmaceutical, and that separation of Tc-99 from Tc-99m is difficult, it is necessary to separate and purify Tc-99m from Mo-99 in a condition in which Tc-99m has as high a specific activity as possible. Therefore, it is preferable that the production section that produces Mo-99, and the purification unit that separates and purifies Tc-99m from Mo-99 be located near each other, and/or that the separation and purification process can be performed during electron beam irradiation.

The use of a powder sample of molybdenum trioxide 100 (Mo-100.O$_3$) as the radionuclide-producing source material permits an increased surface area of the radionuclide-producing source material to be provided. This can expedite freeing of Tc-99m$_2$.O$_7$ generated in the sample from the source material, and can reduce the content of Tc-99m$_2$.O$_7$ remaining in the Mo-100.O$_3$ source material.

By supplying temperature-regulated (heated or cooled) gas to the radionuclide-producing source material (Mo-100.O$_3$ powder sample) when an electron beam is being emitted to the Mo-100.O$_3$ powder sample, freeing of Tc-99m$_2$.O$_7$ generated in the sample from the source material can be further expedited, and the content of Tc-99m$_2$.O$_7$ remaining in the Mo-100.O$_3$ source material can be further reduced. Moreover, application of vibration to the radionuclide-producing source material (Mo-100.O$_3$ powder sample) can further expedite freeing of Tc-99m$_2$.O$_7$ generated in the sample from the source material, and can further reduce the content of Tc-99m$_2$.O$_7$ remaining in the Mo-100.O$_3$ source material.

Preferred embodiments of the present invention will be described below with reference to the accompanying drawings, in which like reference numerals refer to like parts throughout the drawings.

First Embodiment

The configuration of an apparatus for producing a radionuclide according to a first embodiment, which is one preferred embodiment of the present invention, will be described below with reference to FIG. 1.

As shown in FIG. 1, an apparatus for producing a radionuclide of this embodiment includes an electron linear accelerator 1, a sample container 4 for containing radionuclide-producing source material 3, a radionuclide separation/purification unit 5, a thermometer 10, a heating/cooling control unit 11, a heater/cooler 12, a heating/cooling section 13, a gas supply unit 14, a vibration device 20, and a control system (not shown). The radionuclide-producing source material 3 contains a source nuclide from which a radionuclide is generated. This embodiment will be described using the powder sample 3 of molybdenum trioxide 100 (Mo-100.O$_3$) as an example of the radionuclide-producing source material. The thermometer 10 measures the temperature of the molybdenum trioxide 100 (Mo-100.O$_3$) powder sample 3 contained in the sample container 4. The heating/cooling control unit 11 adjusts the temperature of the heater/cooler 12 based on the temperature information of the molybdenum trioxide 100 (Mo-100.O$_3$) powder sample 3 measured by the thermometer 10. The heater/cooler 12 adjusts the temperature of the heating/cooling section 13 to control the temperature of the gas supplied from the gas supply unit 14. The vibration device 20 applies vibration to the sample container 4 to vibrate the molybdenum trioxide 100 (Mo-100.O$_3$) powder sample 3 in the sample container 4. The vibration device 20 may be an ultrasonic vibration device that uses a heat-resistant ultrasonic vibrator.

Figure 7:
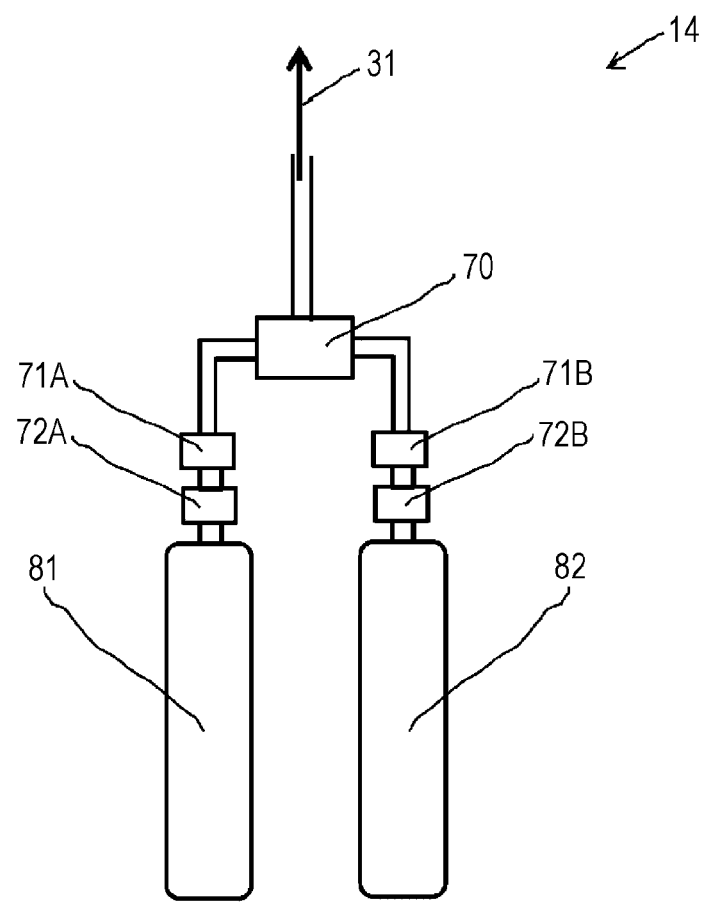
FIG. 7 is a configuration diagram illustrating a configuration of a gas supply unit provided in the apparatus for producing a radionuclide according to the first embodiment.

Referring to FIG. 7, a configuration of the gas supply unit 14 will be described. The gas supply unit 14 includes a gas mixture container 70, an oxygen gas cylinder 81 that retains oxygen gas (O$_3$ gas), a massflow controller 71A that controls the flow rate of the oxygen gas supplied from the oxygen gas cylinder 81, a regulator 72A that controls the pressure of the oxygen gas supplied from the oxygen gas cylinder 81, a noble gas cylinder 82, a massflow controller 71B that controls the flow rate of the noble gas supplied from the noble gas cylinder 82, and a regulator 72B that controls the pressure of the noble gas supplied from the noble gas cylinder 82. In this embodiment, the gas supply unit 14 will be described, by way of example, as supplying a gas mixture 30 of the oxygen gas and the noble gas, but may be configured to supply only the oxygen gas.

The apparatus for producing a radionuclide of this embodiment emits an electron beam 2 accelerated by the electron linear accelerator 1 to the molybdenum trioxide 100 (Mo-100.O$_3$) powder sample 3 to produce molybdenum trioxide 99 (Ma-99.O$_3$). By supplying oxygen gas to the molybdenum trioxide 99 (Mo-100.O$_3$) that has been produced, technetium oxide 99m (Tc-99m$_2$.O$_7$) is produced after molybdenum 99 (Mo-99) in the molybdenum trioxide 99 (Mo-100.O$_3$) decays. The thermometer 10 measures the temperature of the molybdenum trioxide 100 (Mo-100.O$_3$) powder sample 3, and the heating/cooling control unit 11 controls the heater/cooler 12, and thus the oxygen gas, or a gas mixture 30 of the oxygen gas and the noble gas, before passing through the heating/cooling section 13 is heated or cooled to adjust the temperature of the oxygen gas, or the gas mixture 31 of the oxygen gas and the noble gas, after being heated or cooled.

Figure 2:
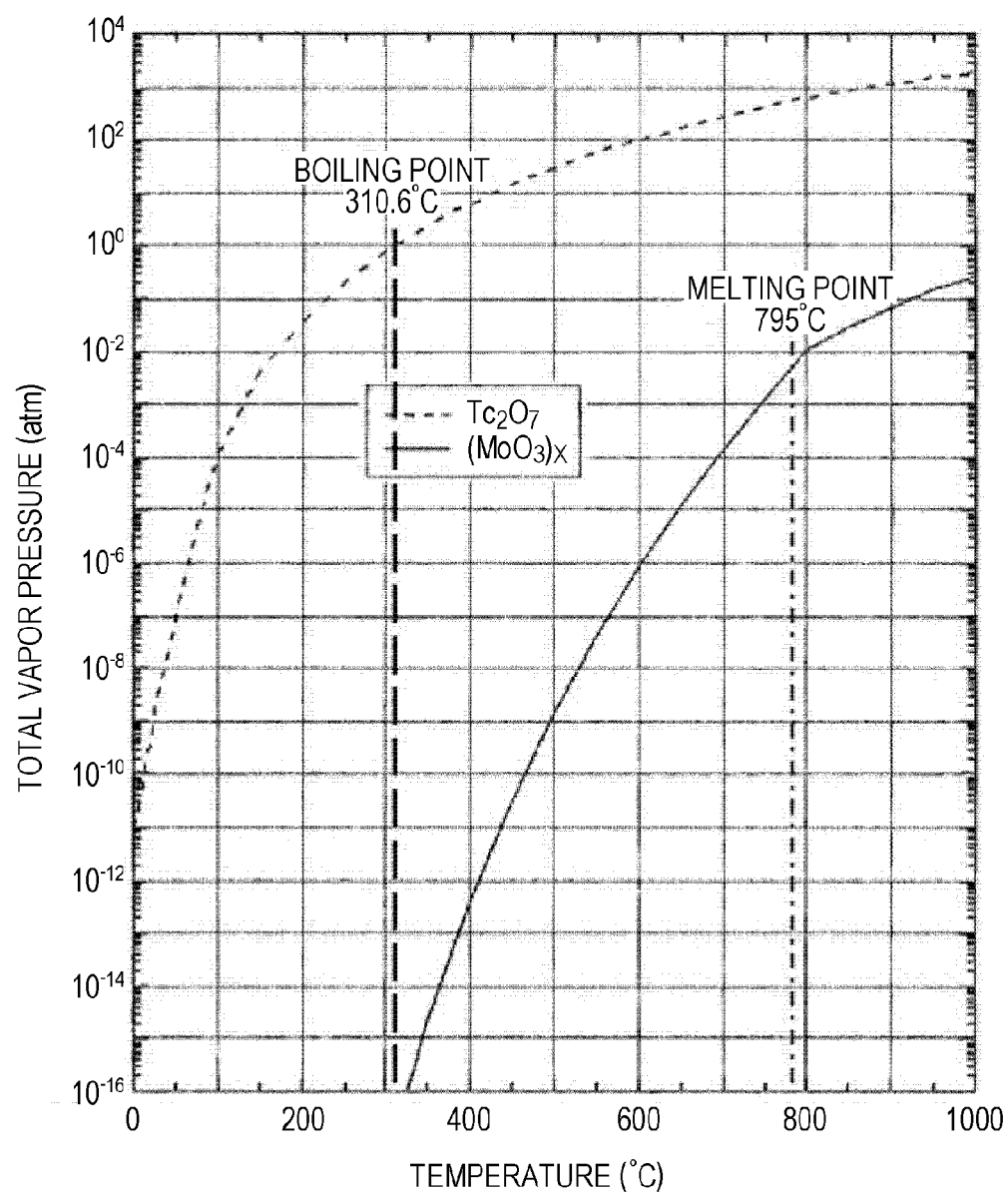
FIG. 2 illustrates vapor pressure curves of $MoO_3$ and $Tc_2O_7$.

FIG. 2 illustrates vapor pressure curves of MoO$_3$ and Tc$_2$O$_7$. The melting point of molybdenum trioxide 100 (Mo-100.O$_3$) or molybdenum trioxide 99 (Mo-99.O$_2$) is 795° C. The boiling point of technetium oxide 99m (Tc-99m$_2$.O$_7$) or technetium oxide 99 (Tc-99$_2$.O$_7$) is 310.6° C. Therefore, the temperature of the oxygen gas, or of the gas mixture 31 of the oxygen gas and the noble gas, is adjusted to a temperature within a range between 310.6° C., which is the boiling point of technetium oxide 99m (Tc-99m$_2$.O$_7$) or of technetium oxide 99 (Tc-99$_2$.O$_7$), and 795° C., which is the melting point of molybdenum trioxide 100 (Mo-100.O$_3$) or of molybdenum trioxide 99 (Mo-99.O$_3$), inclusive. By adjusting the temperature of molybdenum trioxide 100 (Mo-100.O$_3$) powder sample 3 to a temperature within the range between 310.6° C. and 795° C. inclusive, gaseous technetium oxide 99m (Tc-99m$_2$.O$_7$) or gaseous technetium oxide 99 (Tc-99$_2$.O$_7$) is separated and purified from molybdenum trioxide 100 (Mo-100.O$_3$) or molybdenum trioxide 99 (Mo-99.O$_3$), and the oxygen gas, or the gas mixture of the oxygen gas and the noble gas, or gaseous technetium oxide 99m and gaseous technetium oxide 99 generated are transferred to the radionuclide separation/purification unit 5.

During an irradiation period during which the electron beam 2 is emitted to the molybdenum trioxide 100 (Mo-100.O$_3$) powder sample 3, the vibration device 20 applies vibration to the molybdenum trioxide 100 (Mo-100.O$_3$) powder sample 3. Application of vibration expedites freeing of technetium oxide 99m (Tc-99m$_2$.O$_7$) generated in the sample from the sample, and can thus reduce the content of the technetium oxide 99m (Tc-99m$_2$.O$_7$) remaining in the molybdenum trioxide 100 (Mo-100.O$_3$) powder sample 3.

According to this embodiment, a radionuclide having a short half life, such as molybdenum 99 (Mo-99) or technetium 99m (Tc-99m) that is in great demand as a source material of a nuclear medicine diagnostic pharmaceutical can be efficiently produced with a small-sized, lightweight apparatus.

Second Embodiment

Figure 3:
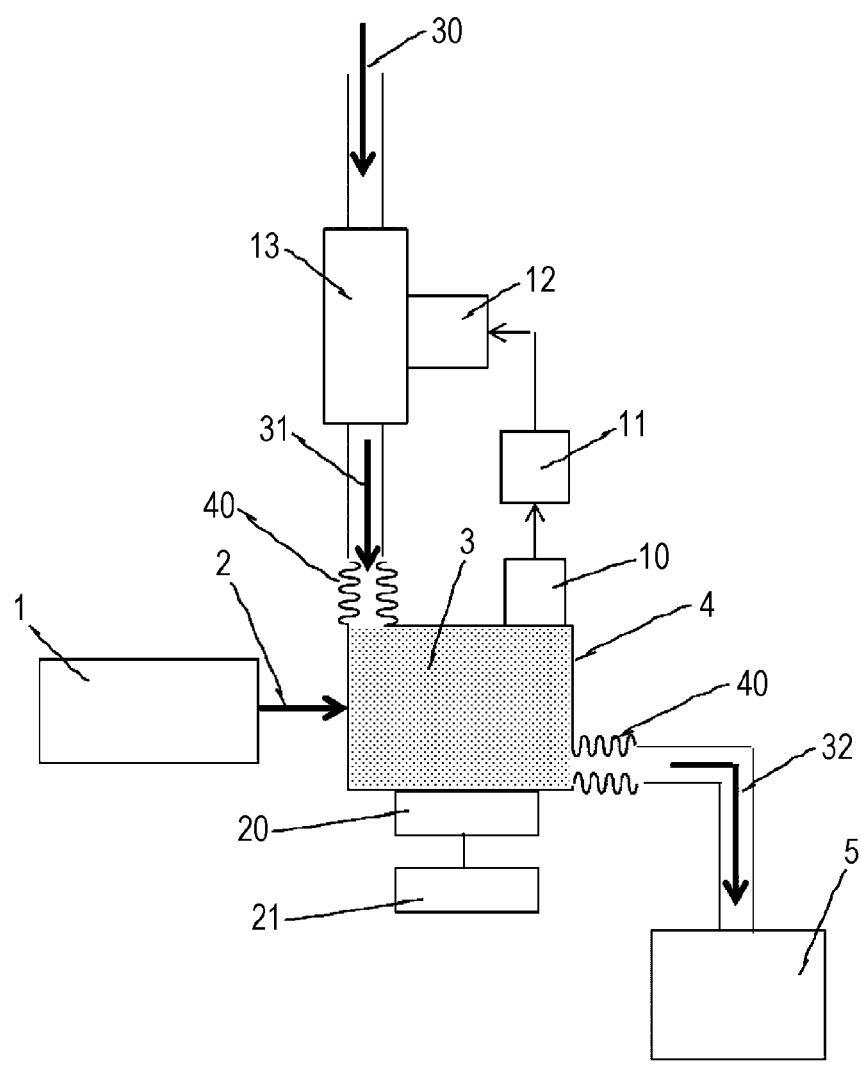
FIG. 3 is a configuration diagram illustrating a configuration of an apparatus for producing a radionuclide according to a second embodiment, which is one preferred embodiment of the present invention.

The configuration of an apparatus for producing a radionuclide according to a second embodiment, which is one preferred embodiment of the present invention, will be described below with reference to FIG. 3. The apparatus for producing a radionuclide of this embodiment has a fundamental configuration similar to that of the apparatus for producing a radionuclide of the first embodiment, but differs from that of the first embodiment in that the pipe that carries the oxygen gas, or the gas mixture 31 of the oxygen gas and the noble gas, after being heated or cooled, and the pipe connected to the separation/purification unit 5 are each connected to the sample container 4 which contains the molybdenum trioxide 100 (Mo-100.O$_3$) powder sample 3 via a joint 40 of the sample container 4 using a bellows-type pipe. The second embodiment will be described below mainly with respect to the configuration different from that of the first embodiment.

The vibration device 20 controlled by a vibration device control unit 21 vibrates the sample container 4 containing the molybdenum trioxide 100 (Mo-100.O$_3$) powder sample 3. Since the vibration can be damped at the joint portions connected by the bellows-type pipes, the pipe that carries the oxygen gas, or the gas mixture 31 of the oxygen gas and the noble gas, and the pipe connected to the radionuclide separation/purification unit 5 are not subjected to unnecessary stress, so that the integrity of the apparatus can be maintained even during the application of vibration. The vibration device 20 may be an ultrasonic vibration device that uses a heat-resistant ultrasonic vibrator.

According to this embodiment, a radionuclide having a short half life, such as molybdenum 99 (Mo-99) or technetium 99m (Tc-99m) that is in great demand as a source material of a nuclear medicine diagnostic pharmaceutical can be efficiently produced with a small-sized, lightweight apparatus.

Third Embodiment

Figure 4:
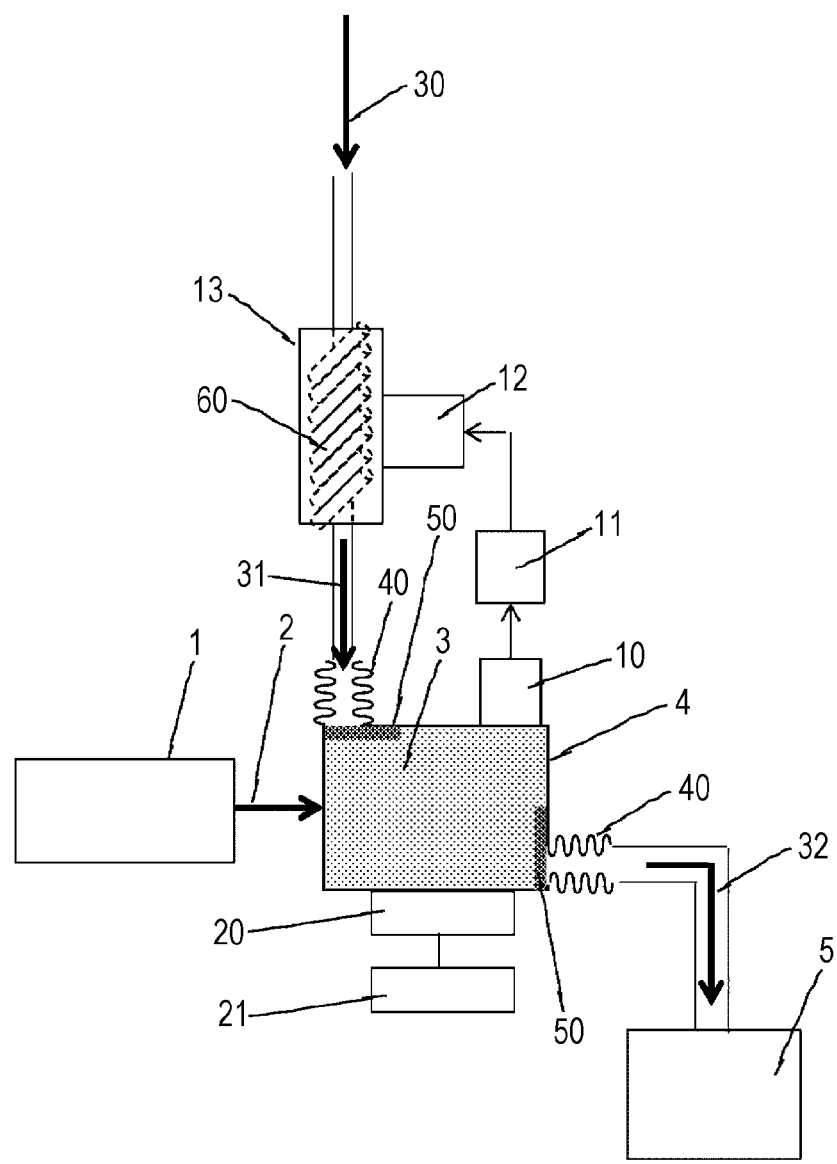
FIG. 4 is a configuration diagram illustrating a configuration of an apparatus for producing a radionuclide according to a third embodiment, which is one preferred embodiment of the present invention.

The configuration of an apparatus for producing a radionuclide according to a third embodiment, which is one preferred embodiment of the present invention, will be described below with reference to FIG. 4. The apparatus for producing a radionuclide of this embodiment has a fundamental configuration similar to that of the apparatus for producing a radionuclide of the second embodiment, but differs from that of the second embodiment in that a spirally-wound heating/cooling pipe 60 is provided in the heating/cooling section 13 relating to the pipe that carries the oxygen gas, or the gas mixture 31 of the oxygen gas and the noble gas, that has been temperature regulated. Providing the spirally-wound heating/cooling pipe 60 in the heating/cooling section 13 as in the apparatus for producing a radionuclide of this embodiment can increase the time period during which the oxygen gas, or the gas mixture 30 of the oxygen gas and the noble gas, flows in the heating/cooling section 13.

In addition, the apparatus for producing a radionuclide of this embodiment includes a mesh filter 50 in each of a pipe section that connects the sample container 4 which contains the molybdenum trioxide 100 (Mo-100.O$_3$) powder sample 3 to the separation/purification unit 5, and a pipe section that connects the sample container 4 which contains the molybdenum trioxide 100 (Mo-100.O$_3$) powder sample 3 to the pipe that carries the oxygen gas, or the gas mixture of the oxygen gas and the noble gas. The mesh filter 50 has a mesh opening size smaller than the particle size of the powder sample, and large enough to permit passage of the oxygen gas and the noble gas, where applicable, or the gaseous technetium oxide 99m (Tc-99m$_2$.O$_7$) and the gaseous technetium oxide 99 (Tc-99$_2$.O$_7$). Providing the mesh filter 50 as in this embodiment prevents the molybdenum trioxide 100 (Mo-100.O$_3$) powder sample 3 from entering the separation/purification unit 5, and permits only the oxygen gas and the noble gas, where applicable, or the gaseous technetium oxide 99m (Tc-99m$_2$.O$_7$) and the gaseous technetium oxide 99 (Tc-99$_2$.O$_7$) to enter the separation/purification unit 5.

According to this embodiment, a radionuclide having a short half life, such as molybdenum 99 (Mo-99) or technetium 99m (Tc-99m) that is in great demand as a source material of a nuclear medicine diagnostic pharmaceutical can be efficiently produced with a small-sized, lightweight apparatus.

Fourth Embodiment

Figure 5:
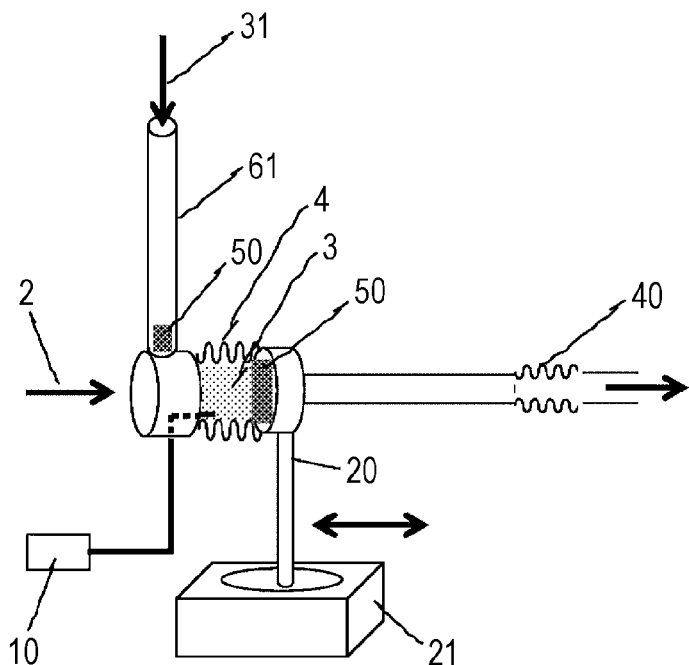
FIG. 5 is a configuration diagram illustrating a configuration of a radionuclide-producing sample section of an apparatus for producing a radionuclide according to a fourth embodiment, which is one preferred embodiment of the present invention.

An apparatus for producing a radionuclide according to a fourth embodiment, which is one preferred embodiment of the present invention, will be described below with reference to FIG. 5. FIG. 5 is a configuration diagram illustrating an example of the radionuclide-producing sample section included in an apparatus for producing a radionuclide of this embodiment. In this embodiment, the sample container 4 is formed of a bellows-type pipe.

The molybdenum trioxide 100 (Mo-100.O$_3$) powder sample 3 is placed in the bellows-type pipe, and an electron beam 2 is emitted thereto. During an irradiation period during which the electron beam 2 is emitted, the vibration device 20, controlled by the vibration device control unit 21, vibrates the sample container 4 which contains the molybdenum trioxide 100 (Mo-100.O$_3$) powder sample 3. The temperature of the sample during the irradiation is measured by the thermometer 10 having a thermocouple or other means. A gas mixture feed pipe 61 for feeding the oxygen gas, or the gas mixture of the oxygen gas and the noble gas, that has been temperature regulated, and a stationary portion of the sample container 4 are connected together, and a mesh filter 50 is provided in this connection portion. The mesh filter 50 has a mesh opening size smaller than the particle size of the powder sample 3, and large enough to permit passage of the oxygen gas and the noble gas, where applicable, or the gaseous technetium oxide 99m (Tc-99m$_2$.O$_7$) and the gaseous technetium oxide 99 (Tc-99$_2$.O$_7$). A similar filter is provided in the pipe section that connects the sample container 4 to the separation/purification unit 5.

The apparatus for producing a radionuclide of this embodiment allows the sample configuration to become more compact, and moreover, permits only the O$_2$ gas and the noble gas, where applicable, or the gaseous technetium oxide 99m (Tc-99m$_2$.O$_7$) and the gaseous technetium oxide 99 (Tc-99$_2$.O$_7$) to enter the separation/purification unit 5 without allowing the molybdenum trioxide 100 (Mo-100.O$_3$) powder sample 3 to enter the separation/purification unit 5.

According to this embodiment, a radionuclide having a short half life, such as molybdenum 99 (Mo-99) or technetium 99m (Tc-99m) that is in great demand as a source material of a nuclear medicine diagnostic pharmaceutical can be efficiently produced with a small-sized, lightweight apparatus.

Fifth Embodiment

Figure 6:
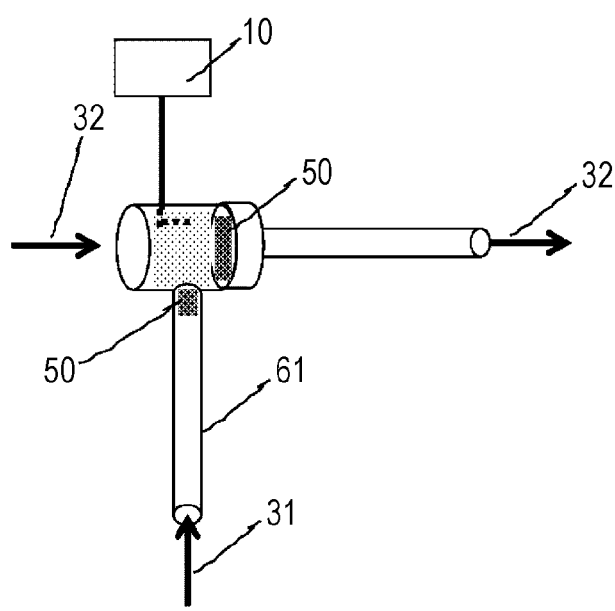
FIG. 6 is a configuration diagram illustrating a configuration of a radionuclide-producing sample section of an apparatus for producing a radionuclide according to a fifth embodiment, which is one preferred embodiment of the present invention.

An apparatus for producing a radionuclide according to a fifth embodiment, which is one preferred embodiment of the present invention, will be described below with reference to FIG. 6. FIG. 6 is a configuration diagram illustrating an example of the radionuclide-producing sample section included in an apparatus for producing a radionuclide of this embodiment. In this embodiment, the gas mixture feed pipe 61 for feeding the oxygen gas, or the gas mixture of the oxygen gas and the noble gas, that has been temperature regulated, is connected to a bottom portion of the sample container 4 which contains the molybdenum trioxide 100 (Mo-100.O$_3$) powder sample 3. A mesh filter 50 is provided in this connection portion. The mesh filter 50 has a mesh opening size smaller than the particle size of the powder sample 3, and large enough to permit passage of the oxygen gas and the noble gas, where applicable, or the gaseous technetium oxide 99m (Tc-99m$_2$.O$_7$) and the gaseous technetium oxide 99 (Tc-99$_2$.O$_7$). The apparatus for producing a radionuclide of this embodiment has a similar mesh filter provided in the pipe section that connects the sample container 4 to the radionuclide separation/purification unit 5.

The introduction of the oxygen gas, or the gas mixture of the oxygen gas and the noble gas, from a bottom portion causes the molybdenum trioxide 100 (Mo-100.O$_3$) powder sample 3 to blow upward, and thus the flow of the oxygen gas, or of the gas mixture of the oxygen gas and the noble gas, creates a stirring effect, which achieves an effect similar to applying vibration to the molybdenum trioxide 100 (Mo-100.O$_3$) powder sample 3. The apparatus for producing a radionuclide of this embodiment needs no particular vibration device, and thus further size reduction can be obtained.

According to this embodiment, a radionuclide having a short half life, such as molybdenum 99 (Mo-99) or technetium 99m (Tc-99m) that is in great demand as a source material of a nuclear medicine diagnostic pharmaceutical can be efficiently produced with a small-sized, lightweight apparatus.

What is claimed is:

1. A method for producing molybdenum trioxide 99 (Mo-99.O$_3$) and technetium oxide 99m (Tc-99m$_2$.O$_7$), comprising:

emitting an electron beam accelerated by an electron linear accelerator to a molybdenum trioxide 100 (Mo-100.O$_3$) powder sample;

supplying a temperature-regulated gas to the molybdenum trioxide 100 powder sample during an irradiation period where the electron beam is emitted to the molybdenum trioxide 100 powder sample; and vibrating the molybdenum trioxide 100 powder sample during the irradiation period.

2. The method according to claim 1, further comprising:
separating and purifying the technetium oxide 99m from both the molybdenum trioxide 99 and the molybdenum trioxide 100.

3. The method according to claim 1, wherein
the gas supplied to the molybdenum trioxide 100 powder sample during the irradiation period is a gas mixture of oxygen gas and a noble gas.

4. The method according to claim 1, further comprising:
measuring a temperature of the molybdenum trioxide 100 Powder sample during the irradiation period;
regulating a temperature of the gas so that the temperature of the molybdenum trioxide 100 powder sample is adjusted to be greater than or equal to a boiling point of the technetium oxide 99m and less than or equal to a melting point of the molybdenum trioxide 100 during the irradiation period.

5. The method according to claim 1, wherein
the vibrating is performed by an ultrasonic vibration device.

6. The method according to claim 1, wherein
the vibrating is performed by stirring with a gas flow.

7. The method according to claim 2, wherein
a first bellows-type pipe supplies the temperature-regulated gas to the molybdenum trioxide 100 powder sample, and a second bellows-type pipe supplies the molybdenum trioxide 99 and the technetium oxide 99m to the separation/purification unit for a separation/purification unit for separating and purifying the technetium oxide 99m.

8. The method according to claim 1, wherein
a bellows-type container contains the molybdenum trioxide 100 powder sample during the irradiation period.

9. The method according to claim 1, wherein
a first pipe supplies the temperature-regulated gas to the molybdenum trioxide 100 powder sample, and a second pipe supplies the molybdenum trioxide 99 and the technetium oxide 99m to a separation/purification unit for separating and purifying the technetium oxide 99m, and
a mesh filter having a mesh opening size smaller than a particle size of the molybdenum trioxide 100 powder sample, and which permits passage of the temperature-regulated gas is located between the first pipe and the molybdenum trioxide 100 powder sample and is located in the second pipe.

10. The method according to claim 1, wherein
a thickness of the molybdenum trioxide 100 powder sample along an emission direction of the electron beam is greater than or equal to a beam path length of the electron beam in the molybdenum trioxide 100 powder sample.

* * * * *